United States Patent [19]
Burgess

[11] Patent Number: 4,957,187
[45] Date of Patent: * Sep. 18, 1990

[54] GEAR-DRIVEN LUBRICANT CIRCULATION SYSTEM

[75] Inventor: Harry L. Burgess, Houston, Tex.

[73] Assignee: Burgess & Associates Mfg., Inc., Houston, Tex.

[*] Notice: The portion of the term of this patent subsequent to Oct. 10, 2006 has been disclaimed.

[21] Appl. No.: 386,999

[22] Filed: Jul. 28, 1989

Related U.S. Application Data

[63] Continuation of Ser. No. 232,318, May 15, 1988, Pat. No. 4,872,530.

[51] Int. Cl.$^5$ .............................................. F01M 5/00
[52] U.S. Cl. .................................. 184/6.12; 184/6.22; 184/96
[58] Field of Search ................. 184/6.12, 6.22, 96, 184/97; 74/467, 468, 785, 801

[56] References Cited

U.S. PATENT DOCUMENTS

| | | | |
|---|---|---|---|
| 1,220,810 | 3/1917 | Alquist | 184/6.12 |
| 1,554,081 | 9/1925 | Garrett | 184/6.12 |
| 3,256,957 | 6/1966 | Miller | 184/6.22 |
| 3,477,547 | 11/1969 | Kress et al. | 184/6.12 |
| 3,601,515 | 8/1971 | Pelizzoni | 184/6.12 |
| 3,625,310 | 12/1971 | Herrick | 184/6.12 |
| 3,822,607 | 7/1974 | Tharaldsen | 184/6.12 |
| 3,973,930 | 8/1976 | Burgess | 55/203 |
| 3,990,539 | 11/1976 | Marit | 184/6.12 |
| 3,999,965 | 12/1976 | Burgess | 55/203 |
| 4,084,946 | 4/1978 | Burgess | 55/192 |
| 4,088,457 | 5/1978 | Phillips et al. | 55/199 |
| 4,201,555 | 5/1980 | Tkach | 55/204 |
| 4,326,863 | 4/1982 | Day et al. | 55/203 |
| 4,365,977 | 12/1982 | Egbert | 55/203 |
| 4,416,672 | 11/1983 | Underwood | 55/203 |
| 4,573,373 | 3/1986 | Shimizu et al. | 74/468 |
| 4,609,385 | 9/1986 | Burgess | 55/193 |
| 4,630,711 | 12/1986 | Levrai et al. | 184/6.12 |
| 4,721,184 | 1/1988 | Sowards | 184/6.12 |

Primary Examiner—Henry A. Bennet
Assistant Examiner—Denise L. Ferensic
Attorney, Agent, or Firm—Carl G. Ries

[57] ABSTRACT

A degasser for removing contaminating gases from an aqueous fluid including a motor having a depending drive shaft, a hollow gear box casing having a lubricant inlet port formed therein adjacent the top thereof, a reduction gear arrangement comprising a stationary ring gear fixed to said gear box casing below said inlet port; the ring gear arrangement including a ring gear having a lubricant outlet port formed therein in a groove between two of the teeth, a plurality of reduction gears operatively interconnected to said drive shaft, a lubricant reservoir adjacent the gear box, a lubricant inlet line interconnecting the lower portion of the lubricant reservoir with the gear box inlet port, and a lubricant outlet line interconnecting the top portion of said lubricant reservoir with the gear box outlet port, whereby each rotation of the reduction gear will force a pulse of lubricant from said gear box through said outlet port and said outlet line to said lubricant reservoir and, whereby, a corresponding pulse of lubricant will flow from said lubricant reservoir through said inlet line to said inlet port for said gear box.

12 Claims, 2 Drawing Sheets

GEAR-DRIVEN LUBRICANT CIRCULATION SYSTEM

This is a continuation of application Ser. No. 07/232,318, filed Aug. 15, 1988 now U.S. Pat. No. 4,872,530.

TECHNICAL FIELD OF THE INVENTION

This invention relates to apparatus useful in the drilling of wells, such as oil wells, wherein a mud pump is used to circulate drilling mud under pressure through a drill string, down to and around the drill bit and out into the annulus between the drill string and the bore hole of the well into a mud tank or reservoir; the apparatus of the present invention being useful for degassing drilling mud used in the drilling of the well. More particularly, this invention relates to a drilling mud degasser having a gear box and means for the continuous self-lubrication of the gear box.

DESCRIPTION OF THE PRIOR ART

In the drilling of wells, such as oil wells, it is a common practice to penetrate the earth with a drill bit supported on a drill string in the bore of a well being drilled. In order to lubricate the drill bit, protect the well against blowouts, etc., it is conventional practice to circulate drilling mud under pressure through the drill string down to and around the drill bit and up the annulus between the drill string and the bore of the well. Mud flowing through the well is passed through a suitable device such as a shaker, etc., in order to remove drill cuttings, etc., and is then delivered to a mud reservoir, such as a mud tank, for recirculation to the mud pump for pressured injection into the well.

It is conventional practice to use a mud pump, such as a duplex or a triplex mud pump comprising reciprocating pistons mounted in cylinders for pressuring the incoming drilling mud and delivering it to the well bore under pressure. The operation and construction of mud pumps is well known to those of ordinary skill in the art, as illustrated, for example, by the textbook "Mud Pump Handbook" by Samuel L. Collier (Gulf Publishing Co., Houston, Texas, 1983).

It is also known to remove contaminating gases such as air, methane, etc., from the drilling mud in the mud tank before it is delivered to a mud pump.

Thus, devices for the removal of contaminating gases from aqueous fluids such as drilling muds is disclosed, for example, in Burgess U.S. Pat. No. 3,973,930 dated Aug. 10, 1976 and entitled "Drilling Mud Degasser Apparatus and Method", Burgess U.S. Pat. No. 3,999,965 dated Dec. 28, 1976 and entitled "Liquid Treating Apparatus", Burgess U.S. Pat. No. 4,084,946 dated Apr. 18, 1978 and entitled "Drilling Mud Degasser", Phillips et al. U.S. Pat. No. 4,088,457 dated May 9, 1978 and entitled "Degassification System", Tkach U.S. Pat. No. 4,201,555 dated May 6, 1980 and entitled "Method and Apparatus for Degassification of Liquid by Inducing Vortexing", Day et al. U.S. Pat. No. 4,326,863 dated Apr. 27, 1982 and entitled "Centrifugal Degasser", Egbert U.S. Pat. No. 4,365,977 dated Dec. 28, 1982 and entitled "Drilling Mud Degasser", Underwood U.S. Pat. No. 4,416,672 dated Nov. 22, 1983 and entitled "Degasser", and Burgess U.S. Pat. No. 4,609,385 dated Sept. 2, 1986 and entitled "Multi-Stage Water Deoxygenator". Among the contaminating gases that are removed are air, nitrogen, carbon dioxide, methane, etc.

The present invention is uniquely adapted for use in connection with a drilling mud degassing device of the type shown in the Burgess patents, such as Burgess Pat. No. 4,084,946.

BACKGROUND OF THE INVENTION

The drilling of deep wells such as oil wells, and especially the drilling of offshore oil wells, is a very costly endeavor. For instance, the cost per day of operating an offshore drilling rig in comparatively shallow waters of 100 feet or less typically amounts to about $10,000 per day while the cost of operating a drilling vessel in deep waters exceeding depths of 200 feet can cost $30,000 per day or more.

It is manifest, therefore, that any interruption of the drilling operation will be very costly, and that it is highly desirable to avoid all but the most essential of drilling interruptions.

As indicated above, it is conventional practice to remove contaminating gases such as methane, air, carbon dioxide, etc., from drilling mud before it is pressured and injected into a well bore. If this is not done, there is an everpresent danger that the gas will accumulate in either the drill string or the well bore annulus in an amount sufficient to form a gas pocket.

Therefore, if a drilling mud degasser fails to operate properly, the drilling operation must be suspended until the drilling mud degasser is repaired.

Moreover, since drilling operations normally continue on an essentially continuous basis for 1 to 12 months or more, any part of the drilling mud degasser that does not have a design life of at least six months is apt to be the cause of an undesired and very expensive interruption of drilling operations.

Drilling mud degassers of the type shown in Burgess U.S. Pat. No. 4,084,946 require a motor, usually an electric motor, which operates a vacuum pump at one rate of speed and a centrifuge tube at another second lower rate of speed. In order to run both the centrifuge tube and the vacuum pump off a single drive shaft, it is necessary to utilize an appropriate gear reduction system, such as a planetary gear reduction system between the drive shaft and the centrifuge tube. Gear reduction systems such as planetary gear reduction systems are normally housed in a gear box.

Since appreciable friction is generated in the gear box during operations, it is necessary that the gear box at all times be properly lubricated with a lubricant which can stand the operating pressures employed. It has been the practice to use a grease, such as a high temperature grease able to withstand temperatures of about 250° F. or more generated in the gear box. Moreover, the gear box needs to be greased on a daily basis and if for any reason the lubrication of the gear box is overlooked by workmen or if the gear box becomes overheated, a gear box failure is likely. When the gear box fails, drilling operations must be interrupted while the drilling mud degasser is taken apart to the extent necessary to replace the damaged gear box with a new gear box. Of course, if a spare gear box is not present on the vessel, an even greater delay will be experienced in bringing a gear box to the vessel. Although the down time of the degasser for the replacement of the gear box will normally be about 2 hours, the down time for the drilling rig will normally amount to 12 hours or more.

There is a need, therefore, for a self-lubricating drilling mud degasser which can operate without maintenance for prolonged periods of time such as about 1 to about 6 months.

SUMMARY OF THE INVENTION

In accordance with the present invention, a self-lubricating centrifugal drilling mud degasser is provided for a degasser of the type wherein a motor is provided with a depending drive shaft. A hollow gear box casing is mounted on the drive shaft and provided with a lubricant inlet port formed therein adjacent the top thereof. A reduction gear arrangement is also provided in the gear box comprising a stationary gear ring fixed to the casing below the inlet port; the ring gear being provided with interior teeth and a lubricant outlet port formed in the groove between two adjacent teeth. A plurality of reduction gears in the gear box are operatively interconnected with the drive shaft.

A lubricant reservoir is located adjacent the gear box and an inlet line is provided interconnecting the lower portion of the lubricant reservoir with the gear box inlet port and with a lubricant outlet line interconnecting the top portion of the lubricant reservoir with the gear box outlet port. As a consequence, since the gear box system is sealed, whenever hot lubricant is pumped from the gear box to the lubricant reservoir, an equivalent quantity of lubricant will automatically flow to the gear box. This is accomplished in accordance with the present invention during operation of the reduction gear system because rotation of the reduction gears about the ring gear will cause the reduction gears to mesh with the adjacent teeth defining the groove between which the outlet port is formed and, as a consequence, a pulse of the lubricant will be pumped from the gear box to the lubricant reservoir and an equivalent pulse of lubricant will flow from the lubricant reservoir back to the gear box.

BRIEF DESCRIPTION OF THE DRAWINGS

In the accompanying drawings.

DESCRIPTION OF THE PREFERRED EMBODIMENT

Figure 1:
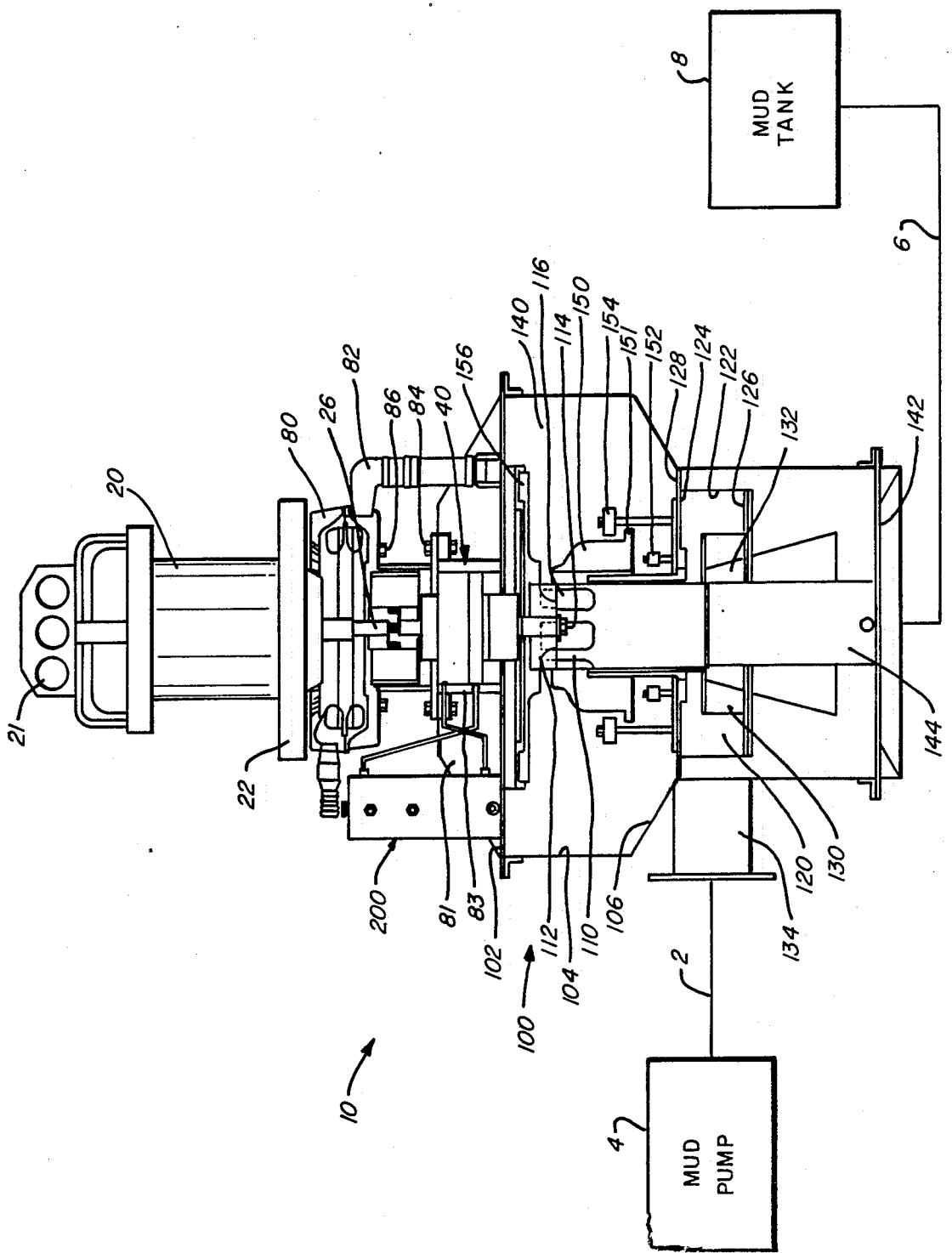
FIG. 1 is a side elevational view illustrating a self-lubricating drilling mud degasser of the present invention.

Referring now to the drawing, and especially to FIG. 1, there is shown a drilling mud degasser designated generally by the number 10 interconnected with a mud tank 8 by an inlet line 6 and with a mud pump 4 by way of an outlet line 2.

An appropriate motor of any suitable construction, such as a diesel motor, a gasoline motor, an electric motor, etc., but preferably an electric motor 20 is provided with a motor handling bracket 21 and a motor support such as a motor support plate 22.

Figure 2:
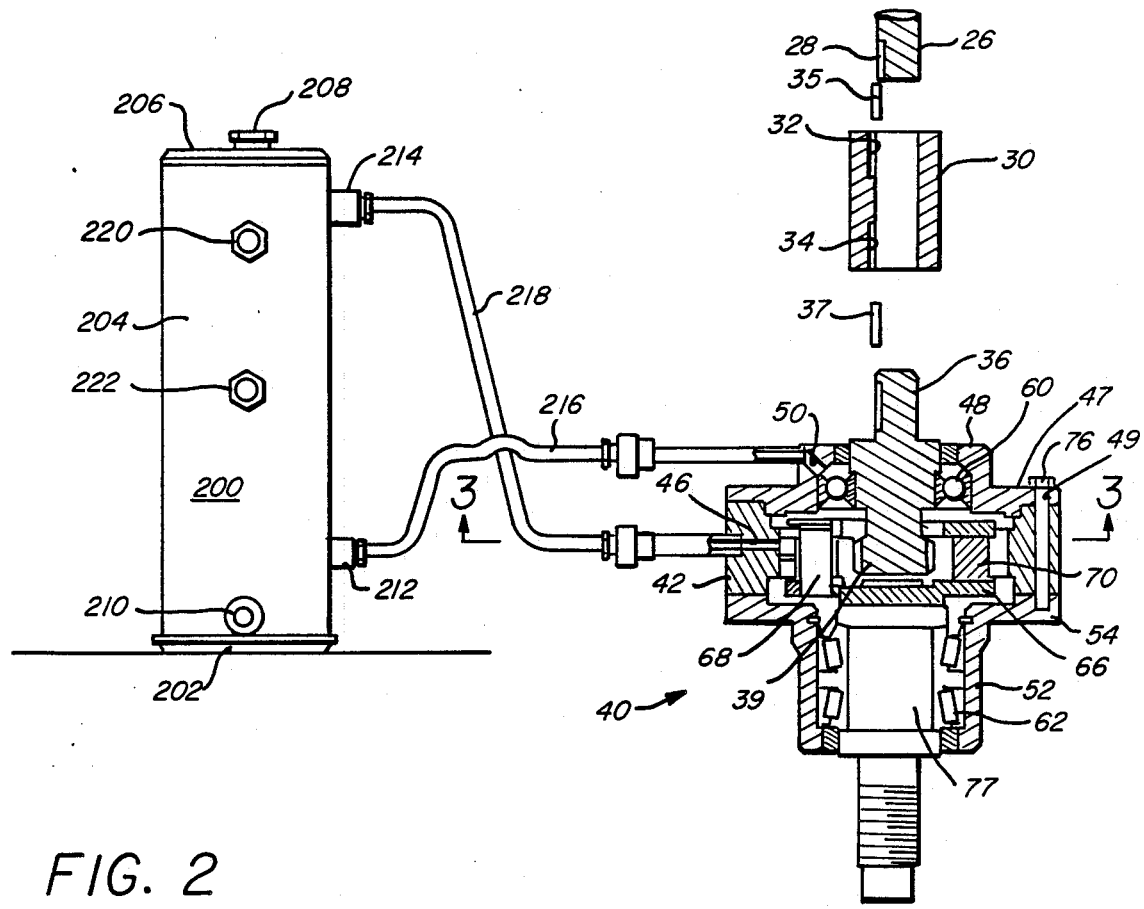
FIG. 2 is a side elevational view, partly in section, showing the combination of a motor drive shaft, a motor drive shaft extension, a gear box containing a planetary gear reduction system, a driven gear and a lubricant reservoir of the present invention.

With reference to FIGS. 1 and 2, a motor drive shaft 26 depends from the motor 20 and is provided with a first interior keyway 26 or any other suitable structure for use in operatively connecting the motor drive shaft 26 with a drive shaft extension 36.

In accordance with this embodiment, a drive shaft coupling 30 is provided which is of a tubular construction having a central opening designed to fit over the depending end of the drive shaft 26 and the upstanding end of the drive shaft extension 36, the drive shaft coupling 30 having a third interior keyway 32 and a fourth interior keyway 34 formed therein.

There is also provided a gear box designated generally by the numeral 40 comprising (with reference to FIGS. 2 and 3) an interiorly toothed ring gear 42 provided with a plurality of interior teeth 44 and, in this embodiment, a plurality of circular fastening shafts 75 milled therein for use in assembly of the gear box 40.

Figure 3:
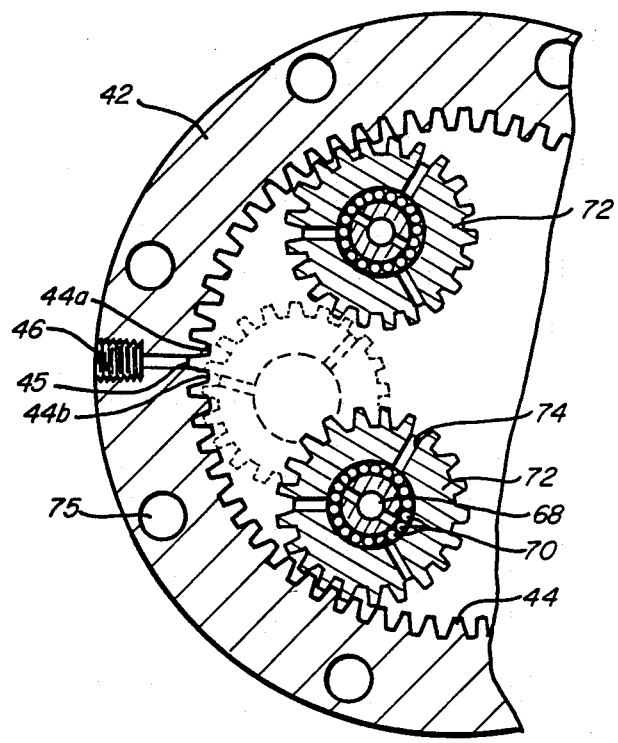
FIG. 3 is a fragmentary sectional view taken along the lines 3—3 of FIG. 2 illustrating in greater detail the manner in which the lubricant outlet port is formed in a ring gear in accordance with the present invention.

With particular reference to FIG. 3, it will be noted that a lubricant inlet port 46 has been formed in the groove between adjacent teeth 44a and 44b for a purpose to be described.

The gear box casing 40 may be formed in any desired manner. In the embodiment shown herein the ring gear 42, for convenience, comprises a part of the gear box casing 40.

Thus, in accordance with this embodiment, there is provided an upper gear box casing member 48 having a lubricant inlet port 50 formed therein and a lower gear box casing member 52. The upper gear box casing member 48 and the lower gear box casing member 52 are interconnected with ring gear 42 by any suitable means. For example, hex bolts 76 extend through upper gear box casing member fastening shafts 49 which are formed in the upper gear box casing flange 47 and are aligned with the ring gear fastening shafts 75 so that the hex bolts 76 can be extended therethrough and threaded into threads tapped into corresponding openings in the fastening flange 54 of the lower gear box casing member 52. An upper bearing 60 is journaled into the upper gear box casing member 48 and a lower bearing 62 is journaled into the lower gear box casing member 52.

It will be understood that the bearings 60 and 62 may be the same or different and will be bearings of the type known to those skilled in the art for supporting a shaft in a casing, such as ball bearings, needle bearings, roller bearings, etc. For example, the upper bearing 60 may suitably comprise a ball bearing and the lower bearing 62 may comprise one or more sets of roller bearings.

A drive shaft extension 36 is mounted in the upper ball bearing 60 and is provided at the lower end thereof with a toothed planetary drive gear 39 designed to operatively engage a gear comprising an appropriate reduction system. The reduction gear system may comprise, for example, one or more appropriately sized and operatively interconnected helical gears, herringbone gears, worm gears, planetary gears, etc. In the preferred embodiment of the invention, the reduction gear system will comprise a plurality of planetary gears 72 which are mounted in planetary ball bearings 70 carried by a plurality of equally spaced upright planetary gear shafts mounted between laterally spaced planetary gear plates 66.

It will be noted from FIG. 3 that each of the planetary gears 70 is provided with one or more planetary ball bearing lubricant ports 74 which are formed in a groove between adjacent teeth of the planetary gear.

With particular reference to FIG. 2, in accordance with the present invention, a lubricant reservoir 200 is provided with is of any suitable construction being formed, for example, of a lubricant reservoir base plate 202, an upstanding cylindrical lubricant reservoir body 204 and a lubricant reservoir cover plate 206 provided with a lubricant filling plug 208. In accordance with this construction, the upstanding cylindrical lubricant reservoir body 204 is also provided with a lubricant reservoir drain plug 210, a lubricant reservoir inlet plug 212, a lubricant reservoir outlet plug 214 and upper sight port 220 and a lower sight port 222.

With this construction, and with the lubricant reservoir filling plug 208 open, an appropriate lubricant such as a liquid hydrocarbon lubricant (e.g., Textron II transmission fluid) can be poured into the reservoir until the fluid level inside the lubricant reservoir 200 is at or above the upper sight port 220. Thereafter, the lubricant reservoir plug may be put back in place in order to seal the reservoir. The lower sight port 222 is provided so that visual inspection will show if the level of a lubricant in the reservoir 200 has fallen to an undesirable level, such as the level below lower sight port 222.

An output shaft 77 is fixed in the planetary gear plate 66 in any suitable fashion (not shown) and supported in the lower ball bearing 62 for a purpose to be described.

A vacuum pump 80 of any suitable construction, such as a "regenerative" vacuum pump of the type formed with a disclike body containing oppositely projecting impeller vanes is operatively connected with the drive shaft 26 above the gear box 40. For example, the vacuum pump 80 is secured to the motor support plate 22 by any suitable means such as a plurality of vacuum motor brackets 81 to which a vacuum motor support stand 83 is fixed by any suitable means such as a plurality of hex bolts 84; the vacuum pump 80 being, in turn, fixed to the vacuum pump support stand 83 by upper hex bolts 86.

The vacuum motor brackets 81 are fixed to the cover plate 102 comprising the top of a vacuum chamber 100 which is further defined by a side wall 104 and a bottom wall 106 to which a cylindrical degassed drilling mud chamber 140 is mounted. The interior of the degassing chamber 100 and the cylindrical degassing drilling mud collection chamber 140 are closed from the atmosphere by a collection chamber base plate 142 and the interior of the degassing chamber 100 is operatively interconnected with the vacuum pump 80 by a vacuum hose 82.

With this construction, and on appropriate operation of the vacuum motor 80, it is possible to maintain a suitable vacuum within the vacuum chamber 100 and the cylindrical degassed drilling mud collection chamber 140, such as a pressure of about 10 inches to about 25 inches of mercury.

The output shaft 77 is journaled into the cover plate 102 of the vacuum chamber 100 and extends into the vacuum chamber 100. A centrifuge tube 110 in the vacuum chamber is provided with centrifuge tube slots 116 in the sidewall thereof adjacent the top thereof and with a centrifuge spider at the top thereof which is fixed to the output shaft 77 by any suitable means such as a spiderretaining bolt 114.

An evacuation pump cross brace spider 128 is mounted inside the vacuum chamber 100 adjacent the bottom thereof intermediate the vacuum chamber 110 and the cylindrical degassed drilling mud collection chamber 140. An evacuation chamber is provided which is mounted on the evacuation pump cross brace spider 128 and is defined by an evacuation pump cover plate 124, a cylindrical evacuation pump side wall casing 122 and an evacuation pump base plate 126.

An evacuation pump of any suitable construction, such as one comprising an evacuation pump impeller 130 mounted on the bottom of centrifuge tube 110 is provided which is mounted inside an evacuation pump inlet venturi 132 leading to a degassed drilling mud discharge line 134.

An inlet line 144 is provided which preferably terminates inside the evacuation chamber 120. In this embodiment, the top of the inlet line 144 is spaced from the bottom of the slotted centrifuge tube 110 so that the rotating centrifuge tube 110 can rotate freely without bearing upon the top of the inlet line 144. The resultant "controlled seepage" of drilling mud from the inlet tube 144 into the evacuation chamber 120 does not seriously adversely affect the performance of the drilling mud degasser and obviates the needs for bearings and seals at the bottom of the slotted centrifuge tube 110.

A donut-shaped scheduling float 150 is annularly mounted about the centrifuge tube 110 in the vacuum chamber 100 and is provided with a lower flange 151 which is designed to seat upon a plurality of lower float stops 152 and to bear against a plurality of upper float stops 154.

As will be hereinafter explained in greater detail, drilling mud contaminated with gas is drawn into the degasser of the present invention through the inlet line 144 and centrifically accelerated inside centriguge tube 110 and then sprayed through the slots 116 at the top of centrifuge tube 110 into the vacuum chamber 100 where the sprayed drilling mud impacts against the side wall 104. As a consequence, contaminating gas is separated from the drilling mud and the degassed drilling mud flows downwardly into the evacuating chamber 120. A portion of the degassed drilling mud accumulated in the evacuation chamber 120 will be drawn by the evacuation pump inlet venturi 132 into the evacuation pump chamber 120 and discharged therefrom through the degassed drilling mud discharge line 134.

It will be apparent that drilling mud will also accumulate in the evacuation chamber 120 and the vacuum chamber 100 and that the level of the degassed drilling mud in the vacuum chamber 100 will be determined by the rate of charge of drilling mud through the inlet line 144 and the centrifuge slots 116 relative to the rate of discharge of degassed drilling mud through the degassed drilling mud discharge line 134. If gas contaminated drilling mud flows through the inlet line 144 faster than degassed drilling mud is withdrawn through the evacuation pump inlet venturi 132, the drilling mud level will rise until the lower float flange 151 of the scheduling float 150 abuts the upper float stops 152. As the float 150 rises, the open area defined by the slots 116 in the centrifuge 110 is reduced to thereby achieve a balance between the rate at which gas contaminated drilling mud is delivered to the degassing chamber 100 and the rate at which degassed drilling mud is withdrawn through the degassed drilling mud discharge line 134. If the rate of discharge through the line 134 is excessive, the drilling mud level in the vacuum chamber 100 will tend to fall thus increasing the open area of the slots 116 in the venturi tube 120 to permit a greater flow of drilling mud into the degassing chamber 100.

The contaminating gases liberated by the action of the centrifute tube and the spraying of the drilling mud into the vacuum chamber 100 will be withdrawn from the vacuum chamber 100 by way of the vacuum hose 82.

In order to prevent entrainment of foam or liquid droplets into the hose 82, a foam separation impeller 156 of any suitable construction comprising, for example, a plate having vanes formed at the outside peripherial edges thereof may be mounted on the output shaft 77 so that the out flowing gas will follow a tortuous path which will permit the occluded foam and the droplets of liquid to accumulate and flow back into the vacuum chamber 100.

OPERATION OF THE PREFERRED EMBODIMENT

It is necessary to maintain a drilling mud at a predetermined weight per gallon, which will vary from well to well. If the drilling mud is diluted for any reason (e.g., by the adsorption of a gas therein), the weight per gallon of drilling mud will decline and the probability of a blowout will increase. Drilling mud exiting a bore hole will typically weigh about 2 lbs. per gallon less than the degassed drilling mud charged to the well and in extreme situations can amount to as much as 50 lbs. per gallon.

Degassing is accomplished in accordance with the present invention by using a drilling mud degasser 10 to remove contaminated gases from the drilling mud.

During operations, when the motor 20 is energized, rotation of the motor drive shaft 26 will cause rapid rotation of the vanes (not shown) of the vacuum pump 80 in order to generate an appropriate vacuum such as a vacuum of from about 10 to about 25 inches of mercury in the vacuum chamber 100.

The motor drive shaft 26, is connected to the drive shaft extension 36 through the drive shaft coupling 30 by means of a first key 35 mounted in first exterior keyway 28 and third interior keyway 32 and a second key 37 located in second exterior keyway 38 and fourth interior keyway 34. As a consequence, the toothed planetary drive gear 39 on the lower end of the drive shaft extension 36 will cause rotation of the planetary gears 72 at a rate of rotation equivalent to the rate of rotation of the motor drive shaft 26. However, rotation of the planetary gears about the interiorly toothed ring gear 42 will cause the planetary gear plate 66 to rotate at a second significantly lower rate of speed. Thus, for example, the motor drive shaft 26 may be operated at a rate of about 3,600 revolutions per minute while the planetary gear plate 66 may operate at a much slower rate of about 800 revolutions per minute, or upon any other desired gear ratio established in the planetary gear system inside the gear box 40.

Rotation of the planetary gear plate 66 will cause a corresponding rotation of the output shaft 77 and the centrifuge tube 110 connected thereto by means of centrifuge tube spider 112 and centrifuge spider retaining bolt 114.

The suction created by the centrifuge tube 110 will cause gas contaminated drilling mud to be delivered from the mud tank 8 by way of a inlet line 6 to the degasser inlet line 144 and thence to the centrifuge tube 110. Within the centrifuge tube 110 the gas contaminated drilling mud will be centrifugally accelerated in its travel up the wall of centrifuge tube 110 and will then be expelled through the slots 116 at the top of the centrifuge tube as a sheet of drilling mud which will impact upon the sidewall 104 of the vacuum chamber 100. As a consequence, gas contaminants entrained in the drilling mud will be liberated and will pass about the foam separation impeller 156 into the vacuum hose 82 and the vacuum pump 80 for discharge from the system. The thus degassed drilling mud will collect at the bottom of degassing chamber 100 into the cylindrical degassed drilling mud collection chamber 140. The evacuation pump impeller 130, on rotation by rotation of the venturi tube 110 to which it is attached, will cause degassed drilling mud to flow from the collection chamber 140 through the evacuation pump inlet venturi 132 into the evacuation chamber 120 where it will be pumped by the evacuation pump impeller 130 from the degasser 10 through the degassed mud discharge line 134 leading to the inlet line 2 for the mud pump 4 where it is repressured for delivery to the drill string.

During the course of operations, appreciable friction will be generated by the rotation of the planetary gears 72 and the planetary gear plate 66 within the gear box 40. However, on each rotation of a planetary gear 72 past the groove 45 between teeth 44a and 44b of the gear ring, a pulse of lubricant will be forced from the gear box 40 through the lubricant outlet port 46. The hot lubricant will flow through the outlet line 218 to the lubricant reservoir 200 where it will accumulate and be cooled either by positive heat exchange means (not shown) or by atmospheric convection. A pulse of cooled lubricant will be redelivered to the gear box 40 from lubricant reservoir 200 by lubricant inlet line 216.

As a consequence, the gears in the gear box 40 will be properly lubricated and overheating will be avoided.

In this manner, a reliable degassing operation can be conducted continuously for as long as 1 to 6 months without a need to replace the gear box 40.

EXAMPLE

In order to obtain geological information, a test well was to be drilled to the top of the basement rock formation of a geological province, the basement rock formation being located several miles below the surface of the earth. It was estimated that more than a year of continuous drilling would be required in order to reach the desired depth and that sedimentary gas-containing formations would be penetrated during the drilling opration.

Drilling operations were commenced using a drilling mud degasser of the type disclosed in Burgess U.S. Pat. No. 4,084,946 wherein the gear box of the degasser was lubricated with a high temperature grease suitable for lubricating the gear box at gear box operating temperatures of about 250° F. After about 60 days of continuous drilling the gear box failed and had to be replaced. It was replaced with a gear box of the type illustrated in the drawings herein wherein the gear box was interconnected in the illustrated manner with a lubricant reservoir containing Textron II transmission fluid.

It was found that with this construction the gear box operated at a significantly lower temperature of about 130° F.

Drilling operations were resumed and in a five month period of continuous drilling no further gear box failures were encountered.

It will be apparent to those skilled in the art that the embodiment illustrated herein is a preferred embodiment which is given by way of illustration only, since the drilling mud degasser may be of any of the many mud pump degasser designs known to those skilled in the art. Accordingly, the preferred embodiment is shown for purposes of illustration only, the scope of the present invention being defined by the appended claims.

What is claimed is:

1. In the combination of a drive shaft operatively connected with a gear box containing a reduction gear the improvement which comprises:
   a. a gear box casing,
   b. a stationary interiorly-toothed ring gear fixed to said gear box casing, said ring gear having a lubricant outlet port formed therein in a groove between two adjacent teeth,
   c. a system of reduction gears in said gear box operatively interconnected with said drive shaft and said ring gear,
   d. a lubricant reservoir containing lubricant adjacent said gear box,
   e. a lubricant inlet line interconnecting the lower portion of said lubricant reservoir with said gear box inlet port, and
   f. a lubricant outlet line interconnecting the top portion of said lubricant reservoir with said gear box outlet port,
   g. whereby, when said reduction gears are driven by said drive shaft, rotation of said reduction gears about said ring gear will force a pulse of lubricant from said gear box through said outlet port and said outlet line to said lubricant reservoir and, whereby, a corresponding pulse of cool lubricant will flow from said lubricant reservoir through said inlet line to said inlet port for said gear box.

2. In the combination of a gear box having an inner chamber containing a drive gear operatively connected and meshed with a driven gear, the improvement which comprises:
   a. a gear box having an inner chamber having a toothed inner chamber surface segment meshing with one of said gears,
   b. said gear box having a lubricant inlet port and a lubricant outlet port formed therein, each of said ports extending from the outside of said gear box to the hollow chamber in said gear box, said outlet port terminating at the surface of said inner chamber in a groove between two adjacent teeth of said toothed inner chamber surface segment,
   c. a lubricant outlet line interconnected with said outlet gear box port, and
   d. a lubricant inlet line interconnected with said inlet gear box port,
   e. whereby, movement of said teeth of said one of said gears past said groove between said two adjacent teeth will force a pulse of lubricant from the groove between said two adjacent teeth through said outlet port and said gear box outlet line.

3. A combination as in claim 1 wherein a lubricant reservoir is fluidly interconnected with said inlet port.

4. A combination as in claim 1 wherein a lubricant reservoir is fluidly interconnected with said outlet port.

5. A combination as in claim 1 wherein a lubricant reservoir fluidly interconnects said inlet line with said outlet line.

6. In a closed liquid lubricant circulation system wherein a liquid lubricant is circulated through a heat-generating work zone and a cooling zone, the improvement which comprises:
   a. a gear box having an inner chamber with a movable toothed gear movably mounted therein, said inner chamber having a toothed inner chamber surface segment meshing with said gear,
   b. said gear box having a lubricant inlet port and a lubricant outlet port formed therein, each of said ports extending from the outside of said gear box to the inner chamber in said gear box, said outlet port terminating at the surface of said inner chamber in a groove between two adjacent teeth of said toothed inner chamber surface segment,
   c. lubricant outlet circulation means fluidly interconnecting said outlet port with said lubricant cooling zone,
   d. lubricant inlet circulation means fluidly interconnected with said inlet port, and
   e. gear turning means operatively interconnected with said gear rotatably mounted in said inner chamber for moving said gear,
   f. whereby, movement of said teeth of said gear mounted in said inner chamber past said toothed inner chamber surface segment and past said outlet port will force a pulse of lubricant through said outlet port to said cooling zone.

7. A circulation system as in claim 6 wherein the toothed inner chamber surface segment of said gear box is a stationary ring gear.

8. A circulation system as in claim 7 wherein the gear turning means comprises a drive shaft journaled in said gear box chamber, said drive shaft having a toothed segment extending into said inner chamber.

9. A circulation system as in claim 8 wherein the rotatable gear in said chamber is a rotatable planetary gear interconnectedly meshed with said ring gear and the toothed segment of said drive shaft.

10. A circulation system as in claim 9 wherein the heat generating zone comprises said gear box and the cooling zone is a lubricant reservoir.

11. A circulation system as in claim 10 wherein the lubricant inlet circulation means fluidly interconnected with said inlet port comprises an inlet line fluidly interconnecting one end of said lubricant reservoir with said inlet port.

12. A circulation system as in claim 11 wherein the lubricant outlet circulation means fluidly interconnected with said outlet port comprises an outlet line fluidly interconnecting said outlet port with the other end of said lubricant reservoir.

* * * * *